United States Patent [19]

Cunningham et al.

[11] Patent Number: 5,376,159
[45] Date of Patent: Dec. 27, 1994

[54] CORROSION INHIBITOR FOR NITROGEN FERTILIZER SOLUTIONS

[75] Inventors: Raymond T. Cunningham, Sugar Land; Kristen T. Moore, Houston, both of Tex.

[73] Assignee: Nalco Chemical Company, Naperville, Ill.

[21] Appl. No.: 119,960

[22] Filed: Sep. 10, 1993

[51] Int. Cl.$^5$ .................. C05C 1/00; C05C 9/00; C05C 13/00
[52] U.S. Cl. .................. 71/30; 71/DIG. 4; 423/269; 252/389.54
[58] Field of Search ............ 71/30, DIG. 4; 423/269; 252/389.54

[56] References Cited

U.S. PATENT DOCUMENTS 3,024,100  3/1962  Langguth et al. .............. 71/34
3,617,240  11/1971  Scott, Jr. et al. ............. 71/29

FOREIGN PATENT DOCUMENTS 865038  3/1971  Canada .

OTHER PUBLICATIONS

Derwent Abstract 78–57487A, Takayaso, "Preventing . . . Molybdate to the Water", 1978.
Derwent Abstract 71-17057S, Allied, "Non–corrosive Fertilizer Solutions", 1967.
CA114 (1):5379n; Physicochemical study of a urea–ammonium nitrate solution containing trace elements; Kosyakov, N. E., Kolyada, M. S., Poyarkova, I. F., Sergienko, I. D.; USSR; 1990.
CA103(19):159722d; Liquid molybdenum–nitrogen fertilizers; Lubis, B., Sviklas, A., Padvaiskas, I.; USSR; 1985.
CA96(17):141787f; Stabilization of nitrogenous fertilizer solutions based on ammonium nitrate and urea; Plasil, Jiri, Kraft, Jaroslav; 1982.
CA92(23):197128b, Effect of microadditives on the physicochemical properties and corroding activity of liquid complex fertilizers based on polyphosphoric acid; Bugai, P. M., Slyn'ko, V. P., Akhtyrskaya, A. A., Makarov, V. A.; 1977.
CA90(11):85942q: Fertilizers solutions; Michaud, Horst, Rieder, Georg, Seeholzer, Joseph; 1978.
CA86(11):70783g; Development of liquid multicomponent fertilizers based on potassium and ammonium nitrates and diphosphates, urea, and water; Endovitskaya, M. R.; Vereshchagina, V. I., 1974.
CA78(12):78878x; Inhibition of steel–3 corrosion in a solution of a concentrated liquid fertilizer; Osipov, A. K.; USSR; 1971.

*Primary Examiner*—Ferris Lander
*Attorney, Agent, or Firm*—Robert A. Miller; James J. Drake

[57] ABSTRACT

A trace amount of a molybdate is disclosed for inhibiting corrosion by concentrated urea-ammonium nitrate fertilizer solutions (UAN) in contact with ferrous metal piping and equipment surfaces. From 10 to 200 ppm of sodium molybdate are blended in a UAN solution containing 20–50 weight percent water for effectively inhibiting corrosion. The corrosion-inhibited UAN solution is non-sludging, non-foaming and essentially free of precipitates.

12 Claims, No Drawings

CORROSION INHIBITOR FOR NITROGEN FERTILIZER SOLUTIONS

FIELD OF THE INVENTION

This invention relates to a corrosion inhibitor for nitrogen fertilizer solutions, and more particularly to inhibiting corrosion by urea ammonium nitrate solutions.

BACKGROUND OF THE INVENTION

Nitrogen solutions represent an important class of fertilizers. A commercially popular nitrogen fertilizer solution is made from urea and ammonium nitrate, often referred to as UAN. The UAN does not need to be kept under pressure, and can be applied directly for agricultural purposes.

The production of UAN solutions is straightforward, comprising blending urea solution, ammonium nitrate solution and any additional water in a mixing tank, in either a batch or a continuous process. Ammonia is sometimes also added to adjust the pH. Mixtures of ammonium nitrate and urea have much greater solubility as compared to that of either material alone. The UAN can be made with as little as 20% by weight water, but more typically contains 30–40% water by weight. The economics of such solutions are relatively attractive in comparison to solids because evaporation is decreased and granulation, drying and conditioning are not necessary.

One problem that has been persistent in the production, storage, transportation and use of UAN has been that the UAN liquid is extremely corrosive to steel piping systems. Without adequate corrosion inhibition, UAN solutions in ferrous tanks or piping systems will become colored within a matter of hours, usually orange or reddish indicating iron corrosion. Filmers have been used to inhibit corrosion, but these suffer from numerous problems. Where the filmer is poorly dispersed in the UAN solution, sludge can be seen as a ring on sample bottles and forms an undesirable buildup in piping and tank bottoms and walls. The use of a dispersant to avoid the sludge problem can cause the UAN solution to foam. Anti-foam additives generally become less effective with time, so the foaming problem can be addressed initially but often will become a serious problem before or during application of the UAN solution. Also, filmers tend to be depleted as the UAN solutions are transferred through a pipeline or from tank to tank since the filmer coats the pipeline or tank surface to protect it from the UAN solution. As the filmer is used up, there is less and less left in the UAN solution for inhibiting corrosion. After the UAN solution has seen enough metal surfaces to use up all of the inhibitor, it suddenly becomes uninhibited and highly corrosive.

The selection of corrosion inhibitors for liquid fertilizer solutions is made more difficult by the presence of environmental considerations. Since the fertilizer solutions are applied to crops, for example, they must be free of compounds which are toxic to the crops being fertilized, and must also facilitate compliance with industrial hygiene standards for the personnel applying the fertilizer. Thus, fluoride compounds, as one example, are undesirable in UAN solutions because they are generally agrotoxins.

Other corrosion inhibitors which are sometimes used in boilers and cooling towers, for example, are incompatible with the relatively more severely corrosive UAN. Borate, for example, a common rust inhibitor, is not sufficiently soluble in UAN and precipitates.

SUMMARY OF THE INVENTION

It has been found that a trace amount of a molybdate can effectively inhibit corrosion by urea-ammonium nitrate solution (UAN) of steel or other ferrous metal surfaces in contact with the UAN during storage, transport, or other processing of the UAN. UAN solutions containing an effective amount of the molybdate for corrosion inhibition are non-sludging, non-foaming and essentially free of precipitate.

Accordingly, in one aspect the present invention provides an improvement in a method for inhibiting corrosion of ferrous metal surfaces by nitrogen fertilizer solutions in contact therewith. The method generally includes the steps of blending a corrosion inhibitor with a fertilizer solution consisting essentially of urea, ammonium nitrate and a minor amount of water, and contacting the metal surfaces with the resulting blend. The improvement comprises using an effective, soluble amount less than 200 ppm, by weight of the fertilizer solution, of a molybdate, preferably an alkali metal molybdate, in the blending step. The amount of the molybdate used is preferably more than 10 ppm and less than 100 ppm by weight of the fertilizer solution. The fertilizer solution can contain from about 20 up to 50 percent by weight water, and preferably has a pH from about 7 to about 8, more preferably from 7.5 to 8. The fertilizer/molybdate blend is preferably essentially free of sludge-forming compounds, of excessive foaming characteristics and of precipitates. The alkali metal molybdate is preferably added to the fertilizer solution as an aqueous solution comprising at least 65 weight percent water.

In another aspect, the present invention provides a method for processing a liquid nitrogen fertilizer in ferrous metal equipment without excessive corrosion. The method includes the steps of blending a solution of urea, a solution of ammonium nitrate and an aqueous solution of an alkali metal molybdate, optionally with water, and recovering the blend. The blend is effectively inhibited against ferrous metal corrosion and comprises a precipitate-free, non-sludging, non-foaming fertilizer solution, containing more than 10 and less than 100 ppm of the alkali metal molybdate and from about 20 to about 50 percent water. As another step, the corrosion-inhibited fertilizer solution is passed in contact with ferrous metal surfaces. The method can also include adjusting the pH of the blend to between 7 and 8, more preferably from 7.5 to 8, with ammonia. The aqueous molybdate solution preferably comprises from 5 to 35 weight percent sodium or potassium molybdate.

The method can further include storing or transporting the inhibited fertilizer solution in ferrous metal piping or containers, then diluting the inhibited fertilizer solution with at least an equal volume of water, wherein the diluted fertilizer solution remains effectively inhibited against corrosion of ferrous metal surfaces, and then applying the diluted fertilizer solution to cropland with ferrous metal equipment.

As a further aspect, the present invention provides a corrosion-inhibited liquid fertilizer. The fertilizer is a non-sludging, non-foaming, precipitate-free solution of urea, ammonium nitrate, more than 20 and less than 50 percent water, and from 10 to 100 ppm sodium or potassium molybdate, having a pH from 7.5 to 8.0 at atmospheric pressure, and essentially non-corrosive to ferrous metal surfaces.

DETAILED DESCRIPTION OF THE INVENTION

The present invention is generally applicable to urea-ammonium nitrate fertilizer solutions (UAN). The invention is, in particular, applicable to concentrated UAN in which it is generally more difficult to inhibit corrosion than in more dilute UAN. The UAN preferably contains a minor amount of water, i.e. less than 50 weight percent, but usually at least 20 weight percent water is necessary to maintain solubility of the urea-ammonium nitrate mixture. The UAN preferably comprises from 20 up to 50 percent water, more preferably from 40 to 50 percent water by weight.

The corrosion inhibitor is a molybdate which is readily soluble in the UAN at effective concentrations for inhibiting corrosion. The molybdate is also preferably non-sludging and non-foaming. As used herein, non-sludging refers to the general absence of sludge formation from the UAN over an extended period of time, e.g. several months in a storage tank. The formation of minor amounts of sludge is permissible, but the sludge should not readily form so as to require frequent cleaning of the equipment, e.g. it should not leave rings in sample bottles or tanks which require frequent cleaning. Similarly, the UAN should not foam excessively, e.g. when it is transferred into or from a tank, or when sprayed in the field as a fertilizer application, such that the foaming substantially interferes with the operation. The formation of solid precipitates is similarly undesirable, and is excessive when the precipitate interferes with processing of the UAN, e.g. settling at the bottom of tanks, plugging lines and/or equipment, and the like.

The molybdate is preferably an alkali metal molybdate such as sodium, potassium or lithium molybdate, or the like. Potassium and sodium molybdate are preferred. Sodium molybdate is especially preferred because it is readily available commercially, soluble in water and UAN, and relatively non-toxic and non-hazardous. Alkali metal molybdate has the further advantage of being a micronutrient for plants.

The molybdate is used in an amount which is effective to inhibit the corrosiveness of UAN toward ferrous metal surfaces. Generally, the use of molybdates in amounts less than 10 ppm by weight of the UAN solution are only marginally effective. While there is generally no upper limit on the theoretical amount of the molybdate which can be used, the molybdate is only soluble in trace amounts, and there is generally no benefit to be gained by using an amount in excess of 250 ppm. Sodium molybdate is preferably used in an amount which is more than 10 ppm and less than 100 ppm.

The corrosion inhibitor of the present invention is readily added to and blended with the UAN using conventional blending techniques. A tank with an agitator is all that is needed, but the molybdate can also be blended by introducing a side stream of the molybdate into the UAN and allowing sufficient mixing to be generated by turbulence as the mixture flows through piping and other equipment. The molybdate can be added as a powder or granulated solid, but is preferably an aqueous solution, for example, from 5 to 35 percent by weight aqueous sodium molybdate. The molybdate can be added to the UAN after the urea, ammonium nitrate and any water are blended, or the molybdate can be added during the blending, or separately to the urea solution, the ammonium solution, and/or any additional water. The corrosion inhibitor can be added or blended on a batch or continuous basis.

Once the molybdate inhibitor is added to the fertilizer solution, it is effectively non-corrosive and can be stored, transported, shipped, or the like in ferrous metal equipment, such as tanks, piping, containers, application equipment or the like. In particular, the inhibited UAN can be diluted with water, generally just prior to field application as a nitrogen fertilizer for agricultural purposes. The concentrated UAN is generally diluted with at least an equal volume of water, up to 4 or 5 volumes of water. Preferably, the molybdate concentration in the concentrated UAN is sufficiently high, so that upon dilution, the diluted UAN is still effectively non-corrosive because of the presence of the molybdate. In addition, the molybdate corrosion inhibitor is also compatible with other common corrosion inhibitors for UAN such as alkyl phosphates, and with various other agricultural compositions, such as, for example, ammonium phosphate solutions, herbicide solutions, insecticide solutions, clay suspensions, herbicide suspensions, insecticide suspensions, and the like. The molybdate-treated UAN can thus be blended and/or used with common agricultural chemicals without substantial adverse consequences.

As used herein, a UAN solution is non-corrosive when the rate of corrosion of carbon steel in contact with the solution at ambient conditions is less than 250 microns per year (about 10 mils/year). The non-corrosive, dilute UAN can thus be applied to cropland for agricultural purposes, with or without dilution and/or admixture with other common agricultural chemicals, using steel or other ferrous metal equipment, such as tanks, lines, pumps, spray nozzles, and the like.

The invention is illustrated by way of the following examples.

EXAMPLES 1-5 AND COMPARATIVE EXAMPLES 1-6

The molybdate corrosion inhibition of the present invention was evaluated in a UAN solution containing 32 weight percent elemental nitrogen and 35 weight percent water. The UAN was treated with 50-200 ppm of a 35 weight percent aqueous sodium molybdate solution. For comparison, a blank was run without any corrosion inhibition, and several runs were made with an organic filmer containing nitrite, polyacrylic acid and about 2-3 weight percent molybdate (Filmer A). Corrosion was evaluated by suspending a 1020 carbon steel coupon in an open beaker of the UAN and additive, and placing the coupon and beaker in a closed oven at 31° C. for 4.75 days. The coupons were activated in 6N hydrochloric acid for 60 seconds and rinsed with deionized water to provide a clean metal surface before immersion in the UAN. At the end of the test, the coupons were removed, cleaned of any corrosion products with deionized water and paper towels, and

TABLE 1

| Example | Additive | Treat Rate** (ppm) | Coupon Weight(g) Initial | Final | Net Loss | Corrosion Rate MPY | μm/year |
|---|---|---|---|---|---|---|---|
| Comp. 1 | None | N/A | 20.9165 | 20.7802 | 0.1363 | 203 | 5160 |
| Comp. 2 | Filmer A | 50 | 20.8454 | 20.6900 | 0.1154 | 231 | 5870 |
| Comp. 3 | Filmer A | 100 | 21.4076 | 21.2864 | 0.1212 | 180 | 4570 |
| Comp. 4 | Filmer A | 100 | 21.5267 | 21.4230 | 0.1037 | 154 | 3910 |
| Comp. 5 | Filmer A | 150 | 21.1117 | 21.0218 | 0.0899 | 134 | 3400 |
| Comp. 6 | Filmer A | 200 | 20.8144 | 20.8126 | 0.0018 | 2.7 | 69 |
| 1 | Na$_2$MoO$_4$* | 50 | 21.5466 | 21.5443 | 0.0023 | 3.4 | 86 |
| 2 | Na$_2$MoO$_4$* | 100 | 21.3113 | 21.3093 | 0.0020 | 3.0 | 76 |
| 3 | Na$_2$MoO$_4$* | 100 | 21.4160 | 21.4592 | 0.0018 | 2.7 | 69 |
| 4 | Na$_2$MoO$_4$* | 150 | 20.4558 | 20.4542 | 0.0016 | 2.4 | 61 |
| 5 | Na$_2$MoO$_4$* | 200 | 21.3652 | 21.3636 | 0.0016 | 2.4 | 61 |

*35 weight percent in water.
**By weight of additive solution, including water.

dried. The weight of the coupons was measured before and after immersion in the UAN to calculate the rate of corrosion in mils per year (MPY) and microns per year. The results are presented in Table 1.

EXAMPLES 6–8 AND COMPARATIVE EXAMPLES 7–10

The procedure of Examples 1–5 was repeated except the coupons were immersed in the UAN for 4.0 days at 31° C. in a thermostated water bath, open to the atmosphere. The results are presented in Table 2.

TABLE 2

| Example | Additive | Treat Rate** (ppm) | Coupon Weight(g) Initial | Final | Net Loss | Corrosion Rate MPY | μm/year |
|---|---|---|---|---|---|---|---|
| Comp. 7 | None | N/A | 9.0160 | 8.6497 | −0.3663 | 98.6 | 2500 |
| Comp. 8 | Filmer A | 100 | 9.2293 | 8.9720 | −0.2567 | 69.1 | 1760 |
| Comp. 9 | Filmer A | 150 | 9.1628 | 8.9336 | −0.2286 | 61.6 | 1560 |
| Comp. 10 | Filmer A | 200 | 9.2337 | 9.0177 | −0.2154 | 58.0 | 1470 |
| 6 | Na$_2$MoO$_4$* | 100 | 9.0789 | 9.0567 | −0.0216 | 5.8 | 147 |
| 7 | Na$_2$MoO$_4$* | 150 | 9.1546 | 9.1387 | −0.0163 | 4.4 | 112 |
| 8 | Na$_2$MoO$_4$* | 200 | 9.2603 | 9.2474 | −0.0123 | 3.3 | 84 |

*35 weight percent in water.
**By weight of additive solution, including water.

EXAMPLES 9–10 AND COMPARATIVE EXAMPLES 11–16

The procedure of Examples 1–8 was repeated except that 1010 carbon steel coupons were used, the coupons were not activated with acid but were washed with methanol and deionized water, and the test was run over in the thermostated water bath at 31° C. open to the atmosphere for a four week period. The time to initial corrosion, visibly apparent by the UAN solution turning orange, was noted for each specimen. For the purposes of comparison, other commercially available corrosion inhibitors (Filmers B and C) were also evaluated in the UAN. Also, a commercially available UAN solution believed to contain a filming inhibitor (Filmer D) at 150 ppm was also evaluated. Corrosion was calculated as follows:

$$\mu m/yr = 2159/t_{IC} \quad (MPY = 85/t_{IC})$$

wherein $t_{IC}$ is the number of days at which corrosion was visibly apparent. The results are presented in Table 3.

TABLE 3

| Example | Additive | Treat Rate** (ppm) | Time to Corrosion (days) | Corrosion Rate MPY | μm/year |
|---|---|---|---|---|---|
| Comp. 11 | None | N/A | 3 | 28.0 | 711 |
| Comp. 12 | Filmer B | 150 | 17 | 5.0 | 127 |
| Comp. 13 | Filmer B | 200 | 19 | 4.25 | 108 |
| 9 | Na$_2$MoO$_4$* | 150 | >28 | <3.0 | <76 |
| 10 | Na$_2$MoO$_4$* | 200 | >28 | <3.0 | <76 |
| Comp. 14 | Filmer C | 150 | 3 | 28.0 | 711 |
| Comp. 15 | Filmer C | 200 | 3 | 28.0 | 711 |
| Comp. 16 | Filmer D | 150 | 16 | 5.3 | 135 |

*35 weight percent in water.
**By weight of additive solution, including water.

From the foregoing it can be seen that sodium molybdate is an effective corrosion inhibitor of steel surfaces in DAN solutions at trace concentrations. While some of the filmers (B and D) appeared to be effective as corrosion inhibitors, a film of organic material was observed floating in each of the DAN beakers for all of the filmers in Comparative Examples 2–6, 8–10 and 12–16. A relatively small amount of orange-white floc was seen early in the test in Examples 1–8, but did not increase as the test progressed. No solids formation was observed in Examples 9 and 10, suggesting that the floc in Examples 1–8 was clue to the acid wash of the coupons. Separate tests corresponding to Examples 9 and 10 were allowed to stand, and after 63 days, no corrosion was observed.

EXAMPLE 11

To demonstrate the non-foaming tendencies of the molybdate, 500 ppm of the 35 weight percent aqueous sodium molybdate of Example 1 was added to the UAN of Example 1. The solution was vigorously shaken in a glass bottle. The bubbles that formed disappeared within 50 seconds after the shaking was stopped, the same result for the UAN as without the molybdate.

EXAMPLE 12

To show the compatibility of the molybdate-UAN mixture with ammonium phosphate solutions, the UAN was mixed with ammonium phosphate (18% in water) and treated with 500 ppm of the 35 weight percent aqueous sodium molybdate of Example 1. Also, a saturated solution of ammonium phosphate (about 48% in water) was treated with 500 ppm of the same sodium molybdate solution. After several days, no precipitation occurred in either of the treated solutions, and there was no indication of any deleterious reaction.

EXAMPLE 13

Ten parts by weight of the pre-emergent SURFLAN (Oryxalin) herbicide was mixed with 90 parts by weight of the UAN of the previous examples (without dilution), with and without 500 ppm of the 35 percent aqueous sodium molybdate solution. Upon vigorous shaking, a small amount of foaming occurred in each bottle and a semi-stable orange suspension formed. The orange powder precipitated out over a 24-hour period. The stability of the foam and suspension was not altered by the molybdate.

EXAMPLE 14

Ten parts of ROUNDUP herbicide solution was mixed with 90 parts of the UAN, with and without the molybdate as in Example 13. Both mixtures formed a homogeneous solution with no foam, and there was no difference observed with the presence of the molybdate.

EXAMPLES 15 AND 16

The procedure of Example 13 was repeated using DIAZINON insecticide solution, and then DURSBAN insecticide solution, with and without molybdate treatment. These mixtures formed emulsions along with a small amount of foam. The DURSBAN insecticide/UAN emulsion began to break after about 5 minutes, but the DIAZINON insecticide/UAN emulsion lasted about 15 minutes. In either case, the sodium molybdate had no impact on foaming or the stability of the emulsion.

EXAMPLES 17 AND 18

The procedure of Example 13 was used to mix 10 parts of a slurry of bentonite clay in water and methanol with 90 parts of the UAN solution, with and without 500 ppm of the 35 weight percent sodium molybdate solution. A stable suspension without foaming was obtained. The molybdate had no observable effect. The tests were repeated with an additional 2 weight percent of powdered BARRICADE 65 WG herbicide. Relatively stable yellow suspensions without foaming were obtained, and again the molybdate had no observable effect.

The foregoing results of Examples 11–18 demonstrate that the sodium molybdate corrosion inhibitor, even at a relatively high treatment rate (175 ppm), has no observable effect on the physical properties of solutions or mixtures of UAN with various common agricultural chemicals.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

We claim:

1. In a method for inhibiting corrosion of ferrous metal surfaces by nitrogen fertilizer solutions in contact therewith, including the steps of blending a corrosion inhibitor with a fertilizer solution consisting essentially of urea, ammonium nitrate and a minor amount of water, and contacting the metal surfaces with the resulting blend, the improvement consisting of:
    using an effective, soluble amount less than 200 ppm, by weight of the fertilizer solution, of an alkali metal molybdate as the corrosion inhibitor in the blending step.

2. The improvement of claim 1, wherein the amount of molybdate used is more than 10 ppm and less than 100 ppm by weight of the fertilizer solution.

3. The improvement of claim 1, wherein the fertilizer solution contains from about 20 to about 50 percent by weight water and has a pH from about 7 to about 8.

4. The improvement of claim 1, wherein the fertilizer/molybdate blend is essentially free of sludge-forming compounds, of excessive foaming characteristics and of precipitates.

5. The improvement of claim 1, wherein the alkali metal molybdate is added to the fertilizer solution as an aqueous solution comprising at least 65 weight percent water.

6. The improvement of claim 1, wherein the molybdate comprises sodium or potassium molybdate.

7. A method for processing a liquid nitrogen fertilizer in ferrous metal equipment without excessive corrosion, consisting of the steps of:
    (a) blending (1) a solution of urea, (2) a solution of ammonium nitrate, (3) optional water and (4) an aqueous solution of an alkali metal molybdate;
    (b) recovering the blend from step (a), wherein the blend is effectively inhibited against ferrous metal corrosion and comprises a precipitate-free, non-sludging, non-foaming solution containing more than 10 and less than 100 ppm of the alkali metal molybdate and from about 20 to about 50 percent water;
    (c) passing the corrosion-inhibited blend in contact with ferrous metal surfaces.

8. The method of claim 7, comprising adjusting the pH of the blend to between 7 and 8 with ammonia.

9. The method of claim 7, wherein the aqueous molybdate solution comprises from about 5 to about 35 weight percent sodium or potassium molybdate.

10. The method of claim 7, comprising storing or transporting the inhibited fertilizer solution in ferrous metal piping or containers, then diluting the inhibited fertilizer solution with at least an equal volume of water, wherein the diluted fertilizer solution is effectively inhibited against corrosion of ferrous metal surfaces, and then applying the diluted fertilizer solution to cropland with ferrous metal equipment.

11. The method of claim 7, comprising storing or transporting the inhibited fertilizer solution in ferrous metal piping or containers, then mixing the fertilizer solution with another agricultural chemical selected from the group consisting of ammonium phosphate, herbicide and insecticide solutions, and clay, herbicide and insecticide suspensions, wherein the physical properties of the fertilizer/agricultural chemical mixture are substantially unaffected by the molybdate, and making an agricultural application of the mixture.

12. A corrosion-inhibited liquid fertilizer, consisting of a non-sludging, non-foaming, precipitate-free solution of urea and ammonium nitrate, of more than 20 and less than 50 percent water by weight and from 10 to 100 ppm sodium or potassium molybdate, having a pH of from 7.5 to 8.0 at atmospheric pressure and essentially non-corrosive to ferrous metal surfaces.

* * * * *

(12) EX PARTE REEXAMINATION CERTIFICATE (6912th)
United States Patent
Cunningham et al.

(10) Number: US 5,376,159 C1
(45) Certificate Issued: Jul. 7, 2009

(54) CORROSION INHIBITOR FOR NITROGEN FERTILIZER SOLUTIONS

(75) Inventors: Raymond T. Cunningham, Sugar Land, TX (US); Kristen T. Moore, Houston, TX (US)

(73) Assignee: Nalco Company, Naperville, IL (US)

Reexamination Request:
No. 90/006,755, Aug. 20, 2003

Reexamination Certificate for:
Patent No.: 5,376,159
Issued: Dec. 27, 1994
Appl. No.: 08/119,960
Filed: Sep. 10, 1993

(51) Int. Cl.
*C05C 5/00* (2006.01)
*C05C 1/00* (2006.01)
*C05C 9/00* (2006.01)
*C05C 13/00* (2006.01)

(52) U.S. Cl. .................. 71/30; 423/269; 252/389.54; 71/DIG. 4

(58) Field of Classification Search .................. None
See application file for complete search history.

(56) References Cited

U.S. PATENT DOCUMENTS 3,024,100 A  3/1962 Langguth et al.

FOREIGN PATENT DOCUMENTS

CA  865038  3/1971

OTHER PUBLICATIONS

Development of a Corrosion Inhibitor for Low Carbon Steel in Concentrated Solutions of Urea–Ammonium Nitrate Fertilizers, Corrosion 88, Mar. 21–25, 1988, Cervantes Convention Center, St. Louis, Missouri.

*Primary Examiner*—Stuart Hendrickson

(57) ABSTRACT

A trace amount of a molybdate is disclosed for inhibiting corrosion by concentrated urea-ammonium nitrate fertilizer solutions (UAN) in contact with ferrous metal piping and equipment surfaces. From 10 to 200 ppm of sodium molybdate are blended in a UAN solution containing 20–50 weight percent water for effectively inhibiting corrosion. The corrosion-inhibited UAN solution is non-sludging, non-foaming and essentially free of precipitates.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12 are cancelled.

* * * * *